(12) United States Patent
Baron et al.

(10) Patent No.: US 12,271,977 B2
(45) Date of Patent: *Apr. 8, 2025

(54) SYSTEMS AND METHODS TO GENERATE A VIDEO OF A USER-DEFINED VIRTUAL REALITY SCENE

(71) Applicant: Mindshow Inc., Los Angeles, CA (US)

(72) Inventors: Gil Baron, Los Angeles, CA (US); Daniel Andrew Bellezza, Van Nuys, CA (US); Jeffrey Scott Dixon, Pasadena, CA (US); William Stuart Farquhar, Hollis, NH (US); Jason Zesheng Hwang, Los Angeles, CA (US); John Henry Kanikula Peters, Los Angeles, CA (US); Nhan Van Khong, Los Angeles, CA (US); Christopher Robert Laubach, Los Angeles, CA (US); Gregory Scott Pease, Burbank, CA (US); Jonathan Michael Ross, Santa Monica, CA (US)

(73) Assignee: Mindshow Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,007

(22) Filed: Apr. 19, 2024

(65) Prior Publication Data

US 2024/0273779 A1  Aug. 15, 2024

Related U.S. Application Data

(63) Continuation of application No. 18/300,163, filed on Apr. 13, 2023, now Pat. No. 11,967,001, which is a continuation of application No. 17/842,292, filed on Jun. 16, 2022, now Pat. No. 11,631,201, which is a continuation of application No. 16/932,473, filed on Jul. 17, 2020, now Pat. No. 11,403,785.

(51) Int. Cl.
*G06T 11/00* (2006.01)
*G06F 3/16* (2006.01)

(52) U.S. Cl.
CPC ............. *G06T 11/00* (2013.01); *G06F 3/165* (2013.01); *G06T 2210/61* (2013.01)

(58) Field of Classification Search
CPC ....... G06T 11/00; G06T 13/40; G06T 19/006; G06T 2210/61; G06F 3/165
See application file for complete search history.

(56) References Cited

U.S. PATENT DOCUMENTS

| | | | |
|---|---|---|---|
| 2005/0171964 A1* | 8/2005 | Kulas | G06T 13/80 |
| 2012/0327088 A1* | 12/2012 | Schnitzer | G06T 13/00 |
| | | | 345/473 |
| 2022/0309717 A1* | 9/2022 | Baron | G06F 3/167 |

* cited by examiner

*Primary Examiner* — Michelle L Sams
(74) *Attorney, Agent, or Firm* — Esplin & Associates, PC

(57) ABSTRACT

Systems and methods for generating a video of a user-defined virtual reality scene are disclosed. Exemplary implementations may: obtain a scene definition; obtain camera information for multiple virtual cameras to be used in generating a two-dimensional presentation of the virtual reality scene; execute a simulation of the virtual reality scene from the scene definition for at least a portion of the scene duration; obtain camera timing instructions specifying which of the virtual cameras should be used to generate the two-dimensional presentation of the virtual reality scene as a function of progress through the scene duration; generate the two-dimensional presentation of the virtual reality scene in accordance with the camera timing instructions and the camera information.

18 Claims, 3 Drawing Sheets

SYSTEMS AND METHODS TO GENERATE A VIDEO OF A USER-DEFINED VIRTUAL REALITY SCENE

FIELD OF THE DISCLOSURE

The present disclosure relates to generating a video of a user-defined virtual reality scene.

BACKGROUND

Capturing a virtual reality scene may require planning and set up of various elements (e.g., lighting, character positioning, filters, etc.). However, adjusting the various elements of the captured virtual reality scene may require re-capturing the virtual reality scene to incorporate those elements and lengthening production time and expenses.

SUMMARY

One aspect of the present disclosure relates to implementing camera information that is individually defined separate virtual cameras used to characterize a two-dimensional presentation of a virtual reality scene. The camera information may define camera capture parameters that characterizes capture preferences for the virtual reality scene. The camera capture parameters may be specified by a user. When a particular virtual camera is activated to switch the point of view of the virtual reality scene, the associated camera information for that particular virtual camera may be implemented along with the capture preferences specified by the user.

One aspect of the present disclosure relates to a system configured to generate a video of a user-defined virtual reality scene. The system may include one or more hardware processors configured by machine-readable instructions. Machine-readable instructions may include one or more instruction components. The instruction components may include computer program components. The instruction components may include one or more of scene definition obtaining component, camera obtaining component, simulation execution component, presentation generating component, and/or other instruction components.

The scene definition obtaining component may be configured to obtain a scene definition and/or other information. The scene definition may include scene information that defines a virtual reality scene. The virtual reality scene may include preset performances of characters within a virtual reality setting over a scene duration from a scene beginning to a scene end. The scene information may include setting information and character information. The setting information may define the setting. The character information may define the characters and the performances of the characters.

The camera obtaining component may be configured to obtain camera information and/or other information for multiple virtual cameras to be used in generating a two-dimensional presentation of the virtual reality scene. By way of non-limiting example, the virtual cameras may include a first virtual camera. The camera information for the first virtual camera may define, as a function of progress through the scene duration, field of view for the first virtual camera, values of camera capture parameters for the first virtual camera, adjustments to the scene information specific to the first virtual camera, and/or other camera information.

The camera obtaining component may be configured to obtain camera timing instructions, and/or other information. The camera timing instructions may specify which of the virtual cameras should be used to generate the two-dimensional presentation of the virtual reality scene as a function of progress through the scene duration.

The simulation execution component may be configured to execute a simulation of the virtual reality scene from the scene definition for at least a portion of the scene duration.

The presentation generating component may be configured to generate the two-dimensional presentation of the virtual reality scene. The generation of the two-dimensional presentation may be in accordance with the camera timing instruction, the camera information, and/or other information. By way of non-limiting example, responsive to the camera timing instructions specifying the first virtual camera is to be used for a first portion of the scene duration, during the first portion of the scene duration the two-dimensional presentation of the virtual reality scene may depict the virtual reality setting and the characters through the field of view of the first virtual camera with the values of the camera capture parameters for the first virtual camera and with the adjustments to the scene information specific to the first virtual camera.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
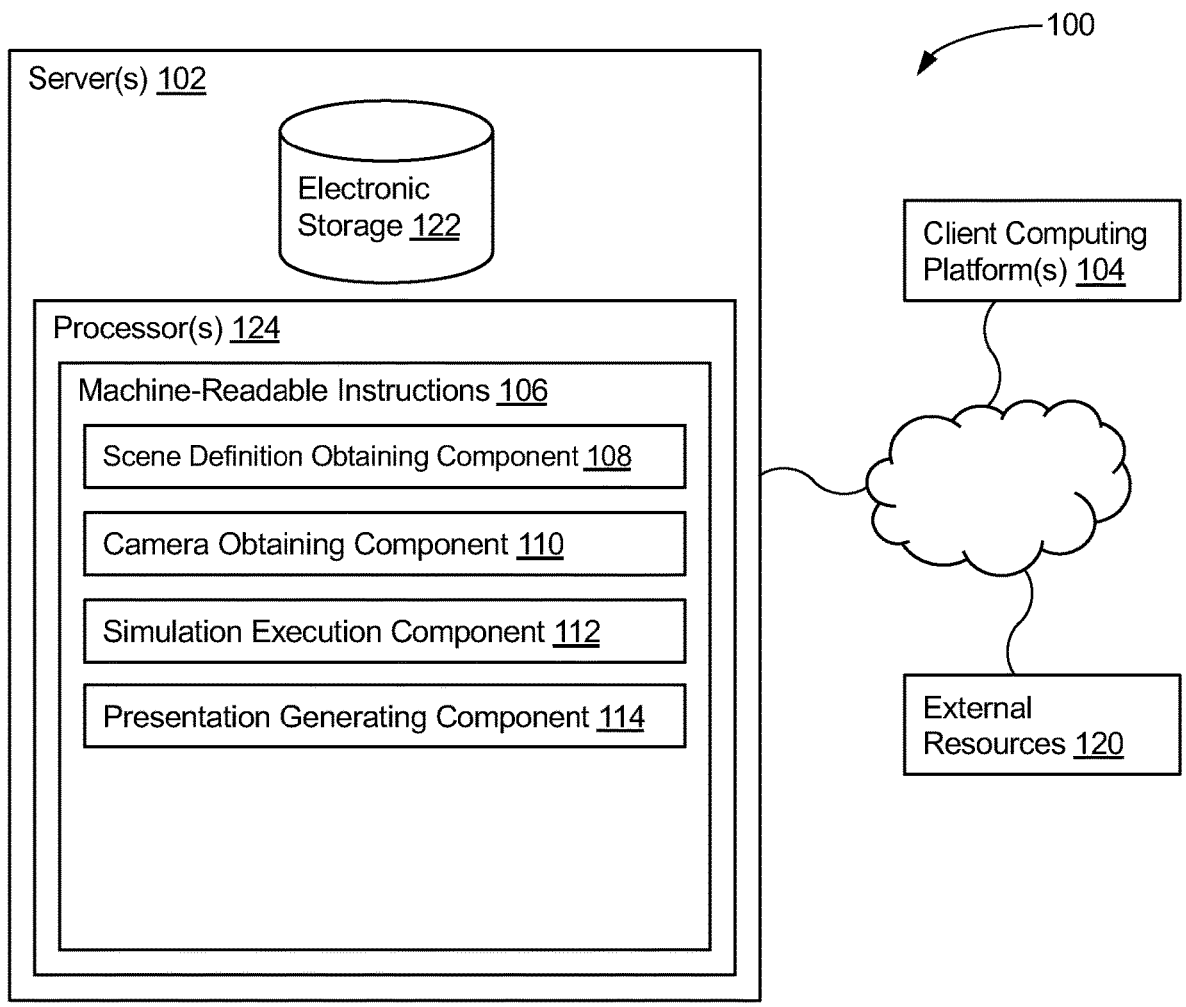
FIG. 1 illustrates a system configured to generate a video of a user-defined virtual reality scene, in accordance with one or more implementations.

FIG. 1 illustrates a system 100 configured to generate a video of a user-defined virtual reality scene, in accordance with one or more implementations. In some implementations, system 100 may include one or more servers 102.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of scene definition obtaining component 108, camera obtaining component 110, simulation execution component 112, presentation generating component 114, and/or other instruction components.

Scene definition obtaining component 108 may be configured to obtain a scene definition and/or other information. The scene definition may include scene information that defines a virtual reality scene. The virtual reality scene may include preset performances of characters within a virtual reality setting over a scene duration. The preset performances of the characters may be individual performances by the characters that are predetermined for execution during the virtual reality scene. The scene duration may span be from a scene beginning to a scene end. The scene beginning may be the start of the virtual reality scene. The scene end may be the termination of the virtual reality scene. The scene information may include setting information, character information, and/or other information.

The setting information may define the setting of the virtual reality scene. The setting may comprise a virtual environment that surrounds the characters and/or inanimate objects. The setting information may include setting values for setting parameters including one or more of a visual appearance, ambient audio, lighting, inanimate objects of the setting, and/or other setting parameters. The visual appearance may include one or more of a color, shading, a pattern, a texture, an animation, and/or other visual appearances. Ambient audio may include one or more background noises such as car traffic, animal noises (e.g., dog barking, birds chirping), talking, and/or other ambient audio. Lighting may include ambient lighting, spot lighting, accent lighting, and/or other lighting. Inanimate objects may include one or more of a furniture, a rock, a vehicle, a weapon, among others. The inanimate objects of the setting may be defined by object values for object parameters including one or more of a visual appearance, an attitude, audio, location, and/or other object parameters. The visual appearance of the inanimate objects may include one or more of a color, a text, a text font, a text size, a pattern, a shading, a texture, a size, a size relative to the setting, and/or other visual appearances. The attitude may include values for a yaw angle, a pitch angle, and a roll angle. The attitude of the inanimate objects may be adjusted so that the inanimate objects may be rotated. The audio of the inanimate objects may include for example, creak audio for furniture, engine audio for a vehicle, burst audio for a weapon, among others. The inanimate objects may be placed in a particular location of the setting. The location may define virtual coordinates within the setting.

The character information may define the characters of the virtual reality scene, the performances of the characters, and/or other information related to the characters. The character information may include character values for character parameters including one or more of a visual appearance, audio, a location, a pose of the characters, a view direction, and/or other character parameters. The visual appearance of the individual characters may include one or more of clothing, a height, a width, a hairstyle, accessories, a skin color, and/or other visual appearances. The audio of the individual characters may include character voices, character-initiated noises (e.g., stomp, clap, etc.) and/or other audio related to the individual characters. The locations of the individual characters may change throughout the scene duration. For example, the characters may walk, run, dance, fight, and/or other actions of which change the location of the individual characters. The locations of the individual characters may define virtual coordinates within the setting that adjust with movement of the characters. Pose of the individual characters may define the posture, attitude (i.e., values for a yaw angle, a pitch angle, roll angle) of the character's body, attitude of the character's head, and/or other poses of the individual characters. View direction of the individual characters may be a direction of which the individual characters are facing and/or looking at.

Camera obtaining component 110 may be configured to obtain camera information and/or other information for multiple virtual cameras to be used in generating a two-dimensional presentation of the virtual reality scene. The camera information may define a field of view for an individual virtual camera, values of camera capture parameters for the individual virtual camera, adjustments to the scene information specific to the individual virtual camera, and/or other information. The camera information for the individual virtual cameras may be defined as a function of progress through the scene duration. Meaning, as the scene duration progresses from the scene beginning to the scene end, the camera information for the individual cameras may be affected. The field of view for the individual camera may defined by based on camera orientation information, camera location information, and/or other information. The camera orientation information may define an orientation of the virtual camera. For example, the orientation of virtual camera may be defined by one or more of a pitch angle, a roll angle, a yaw angle, and/or other measurements. The camera location information may identify a virtual location of the virtual camera. The virtual location may define virtual coordinates, for example.

The camera capture parameters may include parameters related to capturing via the virtual camera and capture preferences. The camera capture parameters may include speed of capture (e.g., slow motion, fast motion), f-stop, focus, frame rate, projection (e.g., orthographic, perspective), and/or other camera capture parameters. The values for the camera capture parameters may be defined according to capture preferences input by one or more users via one or more client computing platforms 104.

The adjustments to the scene information may be specific to a particular virtual camera. The adjustments may include one or more of adjustments or changes to the values that define the lighting of the setting, the ambient audio of the setting, the location of one or more of the inanimate objects, the attitude of the one or more inanimate objects, the audio of the one or more inanimate objects, the pose of the one or more of the characters, the location of the one or more of the characters, the view direction of the one or more characters, other setting information, and/or other character information. One or more of the adjustments may be implemented during one or more portions of the scene durations.

By way of non-limiting example, the virtual cameras may include a first virtual camera, a second virtual camera, and so forth. Camera information for the first virtual camera may define field of view for the first virtual camera, values of camera capture parameters for the first virtual camera, adjustments to the scene information specific to the first virtual camera, and/or other information. The camera information for the first virtual camera may be defined as a function of progress through the scene duration. The camera information for the second virtual camera may define field of view for the second virtual camera, values of camera capture parameters for the second virtual camera, scene information adjustments specific to the second virtual camera, and/or other information. The camera information for the second virtual camera may be defined as a function of progress through the scene duration. The field of view for the second virtual camera may be different than the field of view for the first virtual camera.

The adjustments to the scene information specific to the first virtual camera may include adjustment of the lighting of the setting during the first portion of the scene duration, adjustment of the location of the inanimate objects of the setting during the first portion of the scene duration, adjustment of the pose of the characters during the first portion of the scene duration, and/or other adjustments to the scene information specific to the first virtual camera. For example, the first virtual camera may follow a character from a behind point of view. The lighting of the setting that is specific to the first virtual camera may be adjusted upon the character entering a virtual building from a virtual outdoor environment. For example, during the first portion of the scene duration, the location of a vehicle within the setting may be adjusted. That is, values of the virtual coordinates may be modified to move the vehicle into a more desirable location within the field of view of the first virtual camera.

Simulation execution component 112 may be configured to execute a simulation of the virtual reality scene from the scene definition for at least a portion of the scene duration. The simulation may be an example generation of at least some of the virtual reality scene. Subsequent to executing the simulation of the virtual reality scene for at least the portion of the scene duration, at least some of the camera information may be adjusted. The adjustments may be based on user input from the one or more users. For example, the pose of a character may be adjusted.

Camera obtaining component 110 may be configured to obtain camera timing instructions and/or other information. The camera timing instructions may specify which ones of the virtual cameras should be used to generate the two-dimensional presentation of the virtual reality scene as a function of progress through the scene duration. By way of non-limiting example, scene duration may include the first portion, the second portion, and a third portion. The timing instructions may specify that the first virtual camera should be used for the first portion and the third portion, and the second virtual camera should be used for the second portion. Thus, as the scene duration progress from the first portion through the third portion, the virtual cameras being used are the first virtual camera, the second virtual camera, and back to the first virtual camera.

In some implementations, the camera timing instructions may be obtained prior to the generation of the two-dimensional presentation of the virtual reality scene, and/or at other times. The camera timing instructions obtained prior to the generation of the two-dimensional presentation of the virtual reality scene may include adjusting the path of the virtual cameras. The path may include when and where the virtual camera moves, from what point of view, and/or other information related to the path. By way of non-limiting example, the first virtual camera for the first portion of the scene duration may follow the performance of the characters from a front point of view while the view direction of the characters is at the first virtual camera. The adjustments to the scene information specific to the individual virtual cameras may specify that the view direction of the characters is always towards the virtual camera being used. Thus, in accordance with the camera timing instructions and the adjustments, as the camera in use changes from the first virtual camera to the second virtual camera, the view direction of the characters changes from being towards the first virtual camera to being towards the second virtual camera.

Presentation generating component 114 may be configured to generate the two-dimensional presentation of the virtual reality scene in accordance with the camera timing instructions, the camera information, and/or other information. In some implementations, the camera timing instructions may be obtained (by camera obtaining component 110) during the generation of a portion of the two-dimensional presentation of the virtual reality scene based on user control. Generation of the portion of the two-dimensional presentation of the virtual reality scene may be effectuated during generation of the two-dimensional presentation of the virtual reality scene. User control and user input may be obtained in real time via one or more input devices. The one or more input devices may include one or more of a mouse, keyboard, touchpad, tablet computing device, game console controller, Smartphone, and/or other input devices. The user control may indicate an instance in time of when to use a particular virtual camera.

By way of non-limiting example, the camera timing instructions may specify the first virtual camera is to be used for the first portion of the scene duration and the second virtual camera is to be used for the second portion of the scene duration. Responsive to the camera timing instructions, during the first portion of the scene duration, the two-dimensional presentation of the virtual reality scene may depict the virtual reality setting and the characters through the field of view of the first virtual camera with the values of the camera capture parameters for the first virtual camera and with the adjustments to the scene information specific to the first virtual camera. During the second portion of the scene duration, the two-dimensional presentation of the virtual reality scene may depict the virtual reality setting and the characters through the field of view of the second virtual camera with the values of the camera capture parameters for the second virtual camera and with the adjustments to the scene information specific to the second virtual camera. The second virtual camera may be in use until the user control indicates to use a third virtual camera. The third virtual camera may include camera information specific to the third virtual camera.

In some implementations, presentation generating component 114 may be configured to re-generate the two-dimensional presentation of the virtual reality scene in accordance with the camera timing instructions, the camera information, and/or other information to generate one or more versions of the two-dimensional presentation of the virtual reality scene. Such re-generation may be performed at any time.

Figure 3:
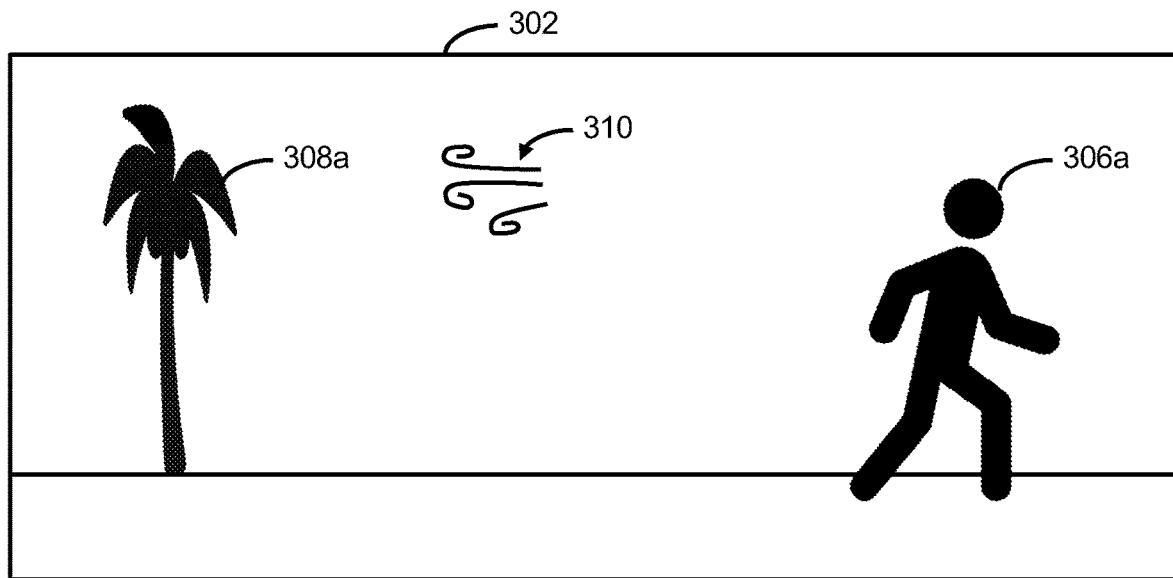
FIG. 3 illustrates an example implementation of a system configured to generate a video of a user-defined virtual reality scene, in accordance with one or more implementations.
Figure 3:
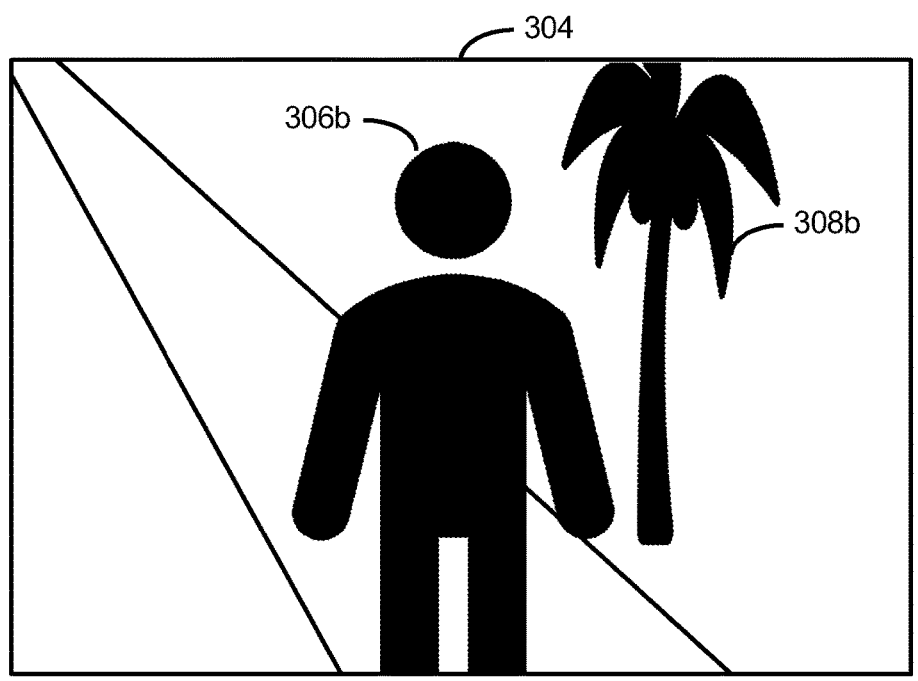

FIG. 3 illustrates an example implementation of a system configured for generating a video of a user-defined virtual reality scene, in accordance with one or more implementations. FIG. 3 includes field of view 302 of a first virtual camera and field of view 304 of a second virtual camera for a virtual reality scene. Field of view 302 may be a wide field of view to capture a side perspective of a character 306a walking along a road with a tree 308a (i.e., an inanimate object) and wind audio 310. Field of view 304 may be a character-focused field of view that capture a front perspective of character 306b where character 306a and character 306b are the same character. Field of view 304 may include tree 308b, the same as tree 308a, but from a different perspective. The virtual reality scene may have a scene duration that includes a primary portion and a subsequent secondary portion. The camera timing instructions may specify to use field of view 302 for the primary portion and subsequently use field of view 304 for the secondary portion. The camera information specific to the second virtual camera may adjust the location of the tree so that tree 308b may appear closer to a location of character 306b along the road in field of view 304 and eliminate wind audio 310. Thus, a two-dimensional presentation of the virtual reality scene may depict field of view 302 and subsequently field of view 304 of which has been adjusted upon use within the virtual reality scene.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, and/or 114, and/or other components. Processor(s) 124 may be configured to execute components 108, 110, 112, and/or 114, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 124 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 124 may be configured to execute one or more additional components that may perform some or all of the functionality attributed below to one of components 108, 110, 112, and/or 114.

Figure 2:
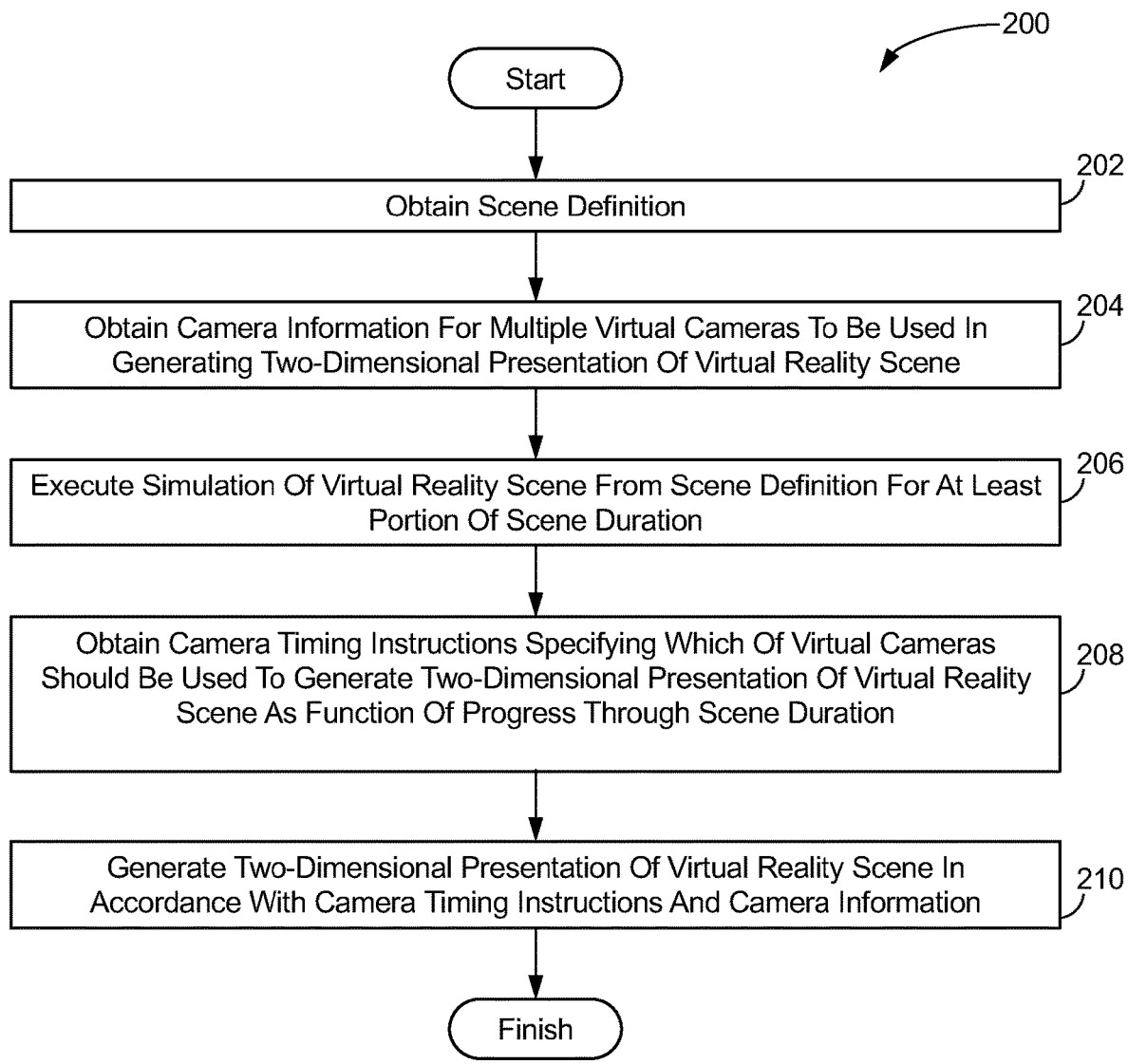
FIG. 2 illustrates a method to generate a video of a user-defined virtual reality scene, in accordance with one or more implementations.

FIG. 2 illustrates a method 200 for generating a video of a user-defined virtual reality scene, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a scene definition. The scene definition may include scene information that defines a virtual reality scene. The virtual reality scene may include preset performances of characters within a virtual reality setting over a scene duration from a scene beginning to a scene end. Operation 202 may be performed by one or more hardware processors configured by machine-readable instructions including a component that is the same as or similar to scene definition obtaining component 108, in accordance with one or more implementations.

An operation 204 may include obtaining camera information for multiple virtual cameras to be used in generating a two-dimensional presentation of the virtual reality scene. Operation 204 may be performed by one or more hardware processors configured by machine-readable instructions including a component that is the same as or similar to camera obtaining component 110, in accordance with one or more implementations.

An operation 206 may include executing a simulation of the virtual reality scene from the scene definition for at least a portion of the scene duration. Operation 206 may be performed by one or more hardware processors configured by machine-readable instructions including a component that is the same as or similar to simulation execution component 112, in accordance with one or more implementations.

An operation 208 may include obtaining camera timing instructions specifying which of the virtual cameras should be used to generate the two-dimensional presentation of the virtual reality scene as a function of progress through the scene duration. Operation 208 may be performed by one or more hardware processors configured by machine-readable instructions including a component that is the same as or similar to camera obtaining component 110, in accordance with one or more implementations.

An operation 210 may include generating the two-dimensional presentation of the virtual reality scene in accordance with the camera timing instructions and the camera information. Operation 210 may be performed by one or more hardware processors configured by machine-readable instructions including a component that is the same as or similar to presentation generating component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for generating a video of a user-defined virtual scene, the system comprising:
   one or more physical processors configured by machine-readable instructions to:
   obtain a scene definition for a virtual scene, the scene definition defining preset performances of entities within a virtual setting over a scene duration from a scene beginning to a scene end;
   obtain camera information for multiple virtual cameras to be used in generating a presentation of the virtual scene, wherein the camera information for individual ones of the multiple virtual cameras defines, as a function of progress through the scene duration, field of view for the individual multiple virtual cameras, values of camera capture parameters for the individual multiple virtual cameras, and adjustments to scene information specific to the individual multiple virtual cameras, wherein the adjustments to the scene information include changes to values that define a location of individual ones of the entities, a size of the individual entities, visual appearance of the virtual setting, and/or ambient audio of the virtual setting;
   obtain camera timing instructions specifying which of the multiple virtual cameras should be used to generate the presentation of the virtual scene as a function of progress through the scene duration;
   generate the presentation of the virtual scene, in accordance with the camera timing instructions and the camera information, depicting the virtual setting and the entities through the field of view of the individual virtual cameras; and
   effectuate, via a client computing platform, the presentation of the virtual scene.

2. The system of claim 1, wherein the entities of the virtual setting include entity visual appearance, attitude, audio, the size, and/or the location, the attitude including a yaw angle, a pitch angle, and a roll angle.

3. The system of claim 2, wherein the adjustments to the scene information specific to the individual multiple virtual cameras includes adjustment of the location of the entities of the virtual setting during particular portions of the scene duration that the individual multiple virtual cameras are used.

4. The system of claim 1, wherein the one or more processors are further configured by the machine-readable instructions to:
   receive alternative camera information and alternative camera timing information; and
   re-generate the presentation of the virtual scene in accordance with the alternative camera timing instructions and the alternative camera information so that a second version of the virtual scene is generated.

5. The system of claim 1, wherein the entities include at least characters defined by character information that includes character visual appearance, audio, the location, and/or pose.

6. The system of claim 5, wherein the adjustments to the scene information specific to the individual multiple virtual cameras includes adjustment of the pose of the entities during particular portions of the scene duration that the individual multiple virtual cameras are used.

7. The system of claim 1, wherein obtaining the camera timing instructions includes obtaining the camera timing instructions prior to the generation of the presentation of the virtual scene.

8. The system of claim 7, wherein the camera timing instructions obtained prior to the generation of the presentation of the virtual scene include adjusting the path of the virtual cameras, wherein the path of the virtual cameras include movement of the virtual cameras and a particular point of view of the virtual cameras while the virtual camera move.

9. The system of claim 1, wherein obtaining the camera timing instructions includes obtaining the camera timing instructions during the generation of presentation of the virtual scene based on user control.

10. A method for generating a video of a user-defined virtual scene, the method comprising:
obtaining a scene definition for a virtual scene, the scene definition defining preset performances of entities within a virtual setting over a scene duration from a scene beginning to a scene end;
obtaining camera information for multiple virtual cameras to be used in generating a presentation of the virtual scene, wherein the camera information for individual ones of the multiple virtual cameras defines, as a function of progress through the scene duration, field of view for the individual multiple virtual cameras, values of camera capture parameters for the individual multiple virtual cameras, and adjustments to scene information specific to the individual multiple virtual cameras, wherein the adjustments to the scene information include changes to values that define a location of individual ones of the entities, a size of the individual entities, virtual appearance of the virtual setting, and/or ambient audio of the virtual setting;
obtaining camera timing instructions specifying which of the multiple virtual cameras should be used to generate the presentation of the virtual scene as a function of progress through the scene duration; and
generating the presentation of the virtual scene, in accordance with the camera timing instructions and the camera information, depicting the virtual setting and the entities through the field of view of the individual virtual cameras; and
effectuating, via a client computing platform, the presentation of the virtual scene.

11. The method of claim 10, wherein the entities of the virtual setting include entity visual appearance, attitude, audio, the size, and/or the location, the attitude including a yaw angle, a pitch angle, and a roll angle.

12. The method of claim 11, wherein the adjustments to the scene information specific to the individual multiple virtual cameras includes adjustment of the location of the entities of the virtual setting during particular portions of the scene duration that the individual multiple virtual cameras are used.

13. The method of claim 10, further comprising:
receiving alternative camera information and alternative camera timing information; and
re-generating the presentation of the virtual scene in accordance with the alternative camera timing instructions and the alternative camera information so that a second version of the virtual scene is generated.

14. The method of claim 10, wherein the entities include at least characters defined by character information includes character visual appearance, audio, the location, and/or pose.

15. The method of claim 14, wherein the adjustments to the scene information specific to the individual multiple virtual cameras includes adjustment of the pose of the entities during particular portions of the scene duration that the individual multiple virtual cameras are used.

16. The method of claim 10, wherein obtaining the camera timing instructions includes obtaining the camera timing instructions prior to the generation of the presentation of the virtual scene.

17. The method of claim 16, wherein the camera timing instructions obtained prior to the generation of the presentation of the virtual scene include adjusting the path of the virtual cameras, wherein the path of the virtual cameras include movement of the virtual cameras and a particular point of view of the virtual cameras while the virtual camera move.

18. The method of claim 10, wherein obtaining the camera timing instructions includes obtaining the camera timing instructions during the generation of presentation of the virtual scene based on user control.

* * * * *